(12) United States Patent
Bonten

(10) Patent No.: US 9,149,713 B2
(45) Date of Patent: Oct. 6, 2015

(54) WHEEL BEARING ASSEMBLY

(71) Applicant: TGM Distribution, Inc., Mount Clemens, MI (US)

(72) Inventor: Charles Bonten, Harrison Township, MI (US)

(73) Assignee: TGM Distribution Inc., Mount Clemens, MI (US)

( * ) Notice: Subject to any disclaimer, the term of this patent is extended or adjusted under 35 U.S.C. 154(b) by 329 days.

(21) Appl. No.: 13/764,851

(22) Filed: Feb. 12, 2013

(65) Prior Publication Data

US 2014/0225419 A1    Aug. 14, 2014

(51) Int. Cl.
| | |
|---|---|
| *A63C 17/22* | (2006.01) |
| *B60B 35/18* | (2006.01) |
| *B60B 35/04* | (2006.01) |
| *B60B 37/00* | (2006.01) |

(52) U.S. Cl.
CPC ............. *A63C 17/223* (2013.01); *A63C 17/226* (2013.01); *B60B 35/18* (2013.01); *B60B 35/04* (2013.01); *B60B 37/00* (2013.01); *B60B 2200/47* (2013.01); *B60B 2380/12* (2013.01); *B60B 2380/75* (2013.01); *B60B 2900/311* (2013.01); *B60B 2900/321* (2013.01)

(58) Field of Classification Search
CPC .... A63C 17/22; A63C 17/223; A63C 17/226; B60B 35/18; B60B 2380/12; B60B 2380/75; B60B 2900/321
USPC .............. 301/5.301, 5.7, 5.305, 5.309, 105.1; 384/544
See application file for complete search history.

(56) References Cited

U.S. PATENT DOCUMENTS

| | | | | | |
|---|---|---|---|---|---|
| 2,022,348 | A | * | 11/1935 | Hoerle | ........................... 301/5.7 |
| 2,440,650 | A |   | 4/1948 | Batesole | |
| 2,610,897 | A |   | 9/1952 | Rebmann | |
| 2,622,930 | A | * | 12/1952 | Negri | .............................. 301/5.7 |
| 3,309,155 | A |   | 3/1967 | Palmer | |
| 3,311,417 | A | * | 3/1967 | Uribe | .............................. 301/5.7 |
| 5,048,848 | A |   | 9/1991 | Olson et al. | |
| 5,271,633 | A |   | 12/1993 | Hill, Jr. | |
| 5,275,472 | A | * | 1/1994 | Hicks | .......................... 301/105.1 |
| 5,275,473 | A | * | 1/1994 | Hicks | .......................... 301/105.1 |
| 5,362,075 | A |   | 11/1994 | Szendel | |
| 5,518,322 | A | * | 5/1996 | Hicks | ............................. 384/544 |
| 5,690,395 | A | * | 11/1997 | Hicks | .......................... 301/105.1 |

(Continued)

FOREIGN PATENT DOCUMENTS

WO    WO 2006/030287 A1    3/2006

OTHER PUBLICATIONS

The Bearing Behind the Official IGSA Downhill Speed World Record!, Seismic Introduces Tekton Bearings, Seismic Skate Systems, http://seismicskate.com/blog/2p=14, 1 page.

*Primary Examiner* — Kip T Kotter
(74) *Attorney, Agent, or Firm* — Reising Ethington P.C.

(57) ABSTRACT

A wheel bearing assembly has a wheel bearing with an inner race and outer race for fitting into a hub of a wheel. Bearings are seated between the inner race and the outer race. The inner race has an extension that axially extends inboard beyond the outer race. A spacer sleeve has a cup shaped end for snugly nesting the extension of the inner race. The cup shaped end has an inner radial wall for abutting an end wall of the inner race. The spacer sleeve also has an outer cylindrical wall forming a side wall of the cup shaped end and has an outer diameter sized for being snugly received into the hub of the wheel.

5 Claims, 2 Drawing Sheets

(56) References Cited

U.S. PATENT DOCUMENTS

| | | |
|---|---|---|
| 5,775,819 A | 7/1998 | Kinney et al. |
| 5,961,132 A | 10/1999 | Post |
| 6,065,760 A | 5/2000 | Weygandt |
| 6,109,796 A | 8/2000 | Wershe |
| 6,309,108 B1 | 10/2001 | Wershe |
| 6,619,758 B1 | 9/2003 | Ross |
| 7,406,989 B1* | 8/2008 | Casaus .................. 152/323 |
| 8,385,040 B1* | 2/2013 | Chen .................... 361/221 |
| 8,418,316 B2* | 4/2013 | Chen ...................... 16/45 |
| 2006/0204156 A1* | 9/2006 | Takehara et al. ........ 384/544 |
| 2013/0009448 A1* | 1/2013 | Feroussier .......... 301/5.305 |

\* cited by examiner

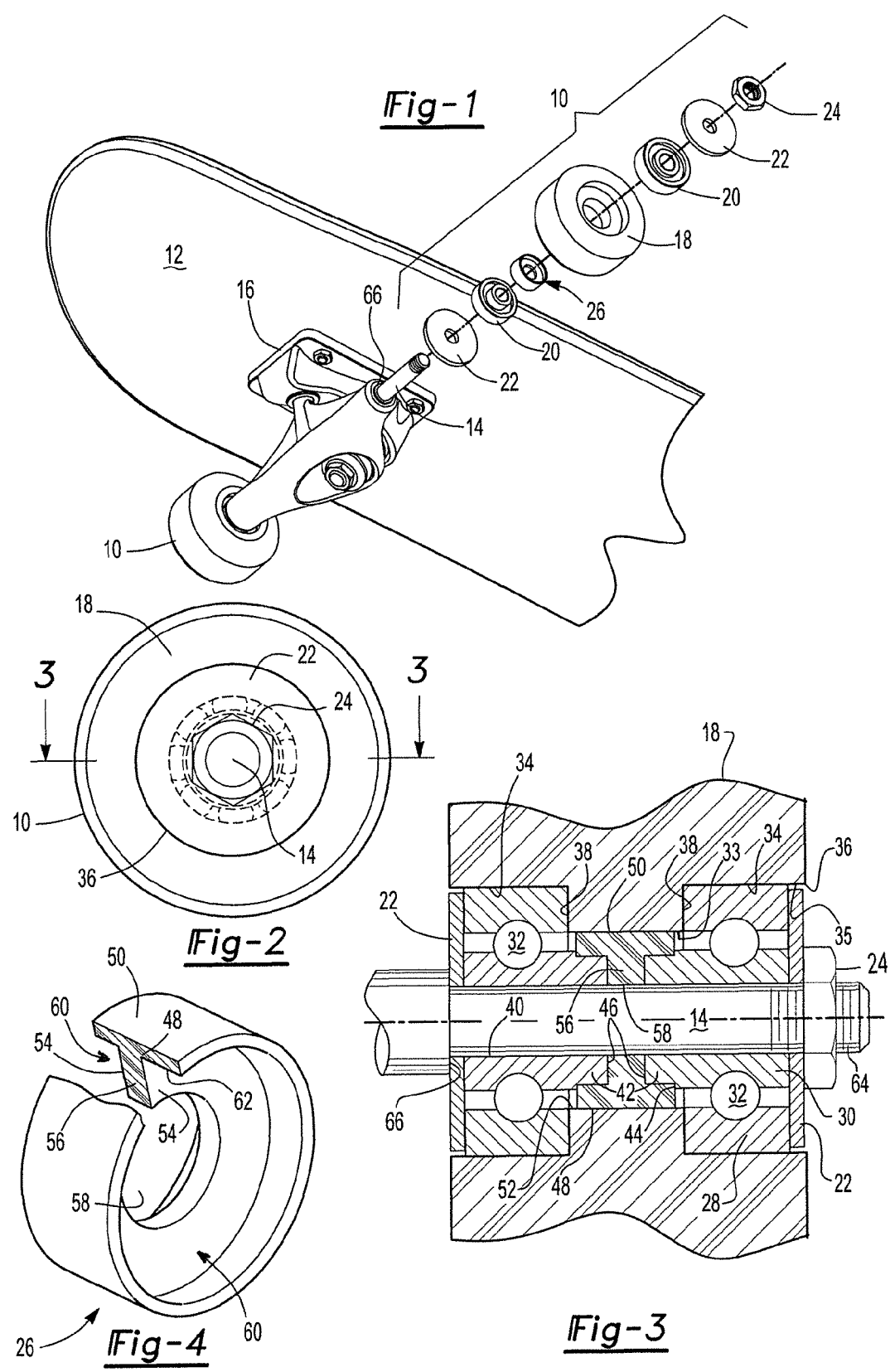

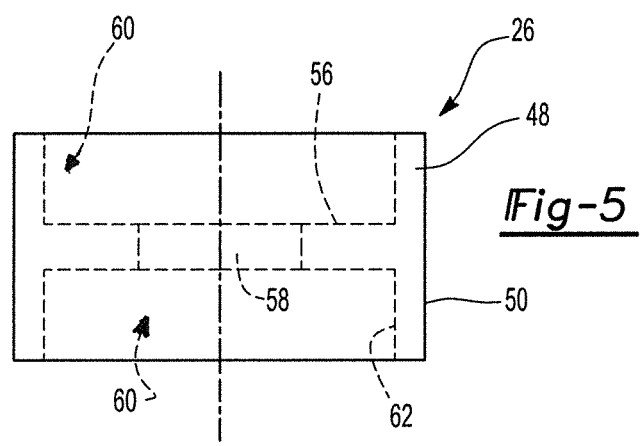
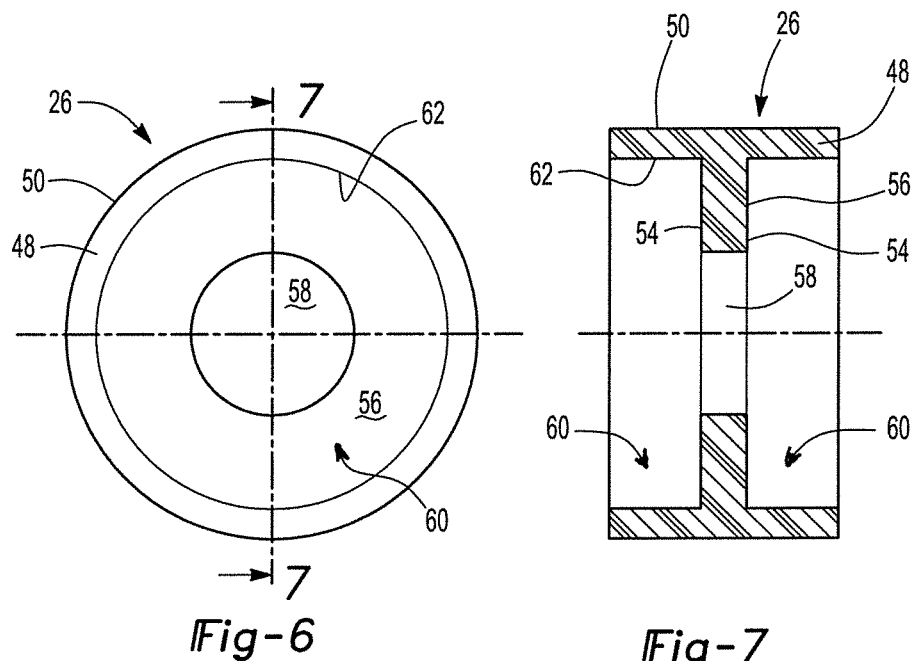

WHEEL BEARING ASSEMBLY

TECHNICAL FIELD

The field of this invention relates to a wheel bearing assembly for use with skateboards.

BACKGROUND OF THE DISCLOSURE

Skateboards have been popular for several decades. Skateboards are no longer just used as a recreational device but are now used competitively in contests of acrobatic skill and for speed records. The speed records may be downhill or motor assisted on flat terrain. Attention has been given to develop high performance wheels including wheel bearing assemblies.

Due to the more aggressive acrobatics and higher speeds, higher side loads are encountered by the bearing assembly then normally encountered during recreational use. A bearing assembly must be able to resist these higher side loads and still maintain its structural integrity. The bearing assembly normally has an outer race and inner race with bearings seated therebetween. The outer race of the wheel bearing is normally securely pressed into a counterbore in the wheel hub. Installation of the wheel bearings is often a compromise between a certain amount of wobble and reductions of free spinning ability. A bearing spacer interposed between the two wheel bearings allows the bearings to be tightly installed and yet maintain free spinning.

While the known bearing spacers are adequate to axially affix both the inner race and outer race, they do not adequately prevent undesireable torsion or rocking of the inner race relative to the outer race. In an attempt to reduce undesireable rocking, the inner inboard and outboard races have been extended or stretched to form what is commonly referred to as a half spacer to abut each other in the middle of the wheel. In one construction, the inner race has its integral half spacer incorporate an enlarged flanged end to create more contact therebetween. However, these constructions have been only partially successful to resist torsion forces and the consequent rocking of the inner race relative to the outer race.

What is needed is an improved wheel bearing construction that resists torsion forces on the inner race relative to the outer race and provide for a more structurally strengthened wheel bearing assembly.

SUMMARY OF THE DISCLOSURE

In accordance with one aspect of the invention a wheel bearing assembly has a wheel having a hub with a central aperture and two opposite counterbores with each counterbore having an outer wall that is cylindrical in shape and with a radial shoulder. A wheel bearing is positioned in each counterbore. Each wheel bearing has an outer race snugly fitted into the cylindrical outer wall of the counterbore and abutting the radial shoulder. Each wheel bearing also has an inner race that has an extension that extends axially toward the middle of the wheel hub beyond the counterbore and the outer race. Bearings are seated between each inner race and outer race. Each inner race has a central aperture to receive a truck axle for a skateboard.

A spacer sleeve is centered between the wheel bearings and has a cylindrical wall with an outer diameter dimensioned to snugly fit in the central aperture of the hub and an inner diameter dimensioned to snugly receive the extension of the inner race of each wheel bearing. The spacer sleeve has opposite radial shoulders to abut the inner facing shoulders of the inner races.

Preferably, the inner facing shoulder is located at an inner end of each inner race. The opposite radial shoulders of the annular spacer sleeve are on opposite sides of a central annular flange extending radially inward from the cylindrical wall. The central annular flange has a central opening sized to receive the truck axle. The truck axle extends through the bearing assembly and has a nut threadably engaged thereon and tightened to clamp the inner races and the annular spacer sleeve between itself and the shoulder on the truck axle.

According to another aspect of the invention, a wheel bearing assembly has a pair of wheel bearings each with an inner race and outer race for fitting into the hub of the wheel. Bearings are seated between the inner and outer races. The inner races each have an extension that extends inboard beyond the outer races toward each other. A centrally located spacer has two cup shaped openings for snugly nesting the respective extensions. The cup shaped openings each are defined in part by an inner radial wall for abutting a respective end wall of the inner race. The centrally located spacer also has a cylindrical wall forming a side wall of the cup shaped openings. The cylindrical wall has an outer diameter dimensioned for being snugly received into the hub of the wheel.

According to another aspect of the invention, a wheel bearing assembly has a wheel bearing with an inner race and outer race for fitting into a hub of a wheel. Bearings are seated between the inner race and the outer race. The inner race has an extension that extends axially inboard beyond the outer race. A spacer sleeve has a cup shaped opening for snugly nesting the extension of the inner race. The cup shaped opening is defined in part by an inner radial wall for abutting an end wall of the inner race. The spacer has a cylindrical wall defining in part the cup shaped opening with an outer diameter dimensioned for being snugly received into the hub of the wheel.

BRIEF DESCRIPTION OF THE DRAWINGS

Reference now is made to the accompanying drawings in which:

FIG. 1 is a fragmentary perspective view of a skateboard truck having an improved wheel bearing assembly according to one embodiment of the invention;

FIG. 2 is a side elevational view of an assembled wheel as shown in FIG. 1;

FIG. 3 is a fragmentary cross-sectional view taken along lines 3-3 shown in FIG. 2;

FIG. 4 is an enlarged fragmentary perspective view of the spacer shown in FIG. 3;

FIG. 5 is a plan view of the spacer ring shown in FIG. 4;

FIG. 6 is a side elevational view of the spacer shown in FIG. 3; and

FIG. 7 is a cross-sectional view taken along lines 7-7 shown in FIG. 6.

DETAILED DESCRIPTION OF THE PREFERRED EMBODIMENT

Referring now to FIG. 1, a wheel assembly 10 is connected to an axle 14 of a skate truck 16 that is mounted on the underside of a skateboard 12. The wheel assembly has a wheel 18, bearing assemblies 20, two cover washers 22, a tightening nut 24 and a centrally located annular spacer sleeve 26. The wheel is preferably made from standard material such as a highly durable elastomeric composition. The bearings and washers are also preferably made from standard materials such as steel or other high strength metals. The wheel has a central hub 36 with a central aperture 33, two counterbores 34, each with a cylindrical peripheral wall 35 and an inner radially extending shoulder 38.

Referring now to FIGS. 2 and 3, each bearing assembly 20 has an outer race 28 and an inner race 30 with a plurality of ball bearings 32, i.e., bearing members, seated therebetween.

Other bearing member types are foreseen, e.g. frusto-conical or cylindrical bearing members. Each bearing assembly 20 is seated in a counterbore 34. The outer race 28 has an outer diameter dimensioned to snugly fit within the peripheral cylindrical wall 35 of the counterbore 34. The outer race 28 also abuts the inner shoulder 38 at the end of the counterbore 34.

The inner race 30 has a central aperture 40 that snugly receives the axle 14. Each inner race 30 has an inner extension 42 which axially extends past the shoulder 38 to the central aperture 33. The inner extension may have an outer diameter slightly less than the rest of the inner race to form a shoulder 44. The inner extension has inner end walls 46 spaced from each other.

The spacer sleeve 26 as best shown in FIGS. 4-7 has a peripheral wall 48 with an outer peripheral wall 50 i.e., side wall or outer surface with an outer diameter that snugly fits to abut the cylindrical wall 52 about aperture 33 and an inner wall or surface 62. The spacer sleeve 26 also has opposite facing radial shoulders 54 in the form of a central annular flange 56 extending inwardly from the outer peripheral wall 50. The annular flange 56 has a central aperture 58 sized to receive the axle 14. The outer peripheral wall 50 and annular flange 56 form two opposite cup sections 60 which nest the inner extensions 42 therein. The radial shoulders 54 abut the end walls 46. The inner cylindrical wall 62 i.e., inner surface, abuts the outer periphery of each extension 42. The spacer 26 is preferably made from steel, other high strength metal to provide rigid support. Other materials such as rigid structurally reinforced composites are also foreseen to be suitable.

Installation is completed by tightening the nut 24 onto a threaded end 64 of the axle 14 to clamp the wheel bearing, cover washers, and central spacer sleeve 26 together where one cover washer 22 abuts a shoulder 66 on the axle and the other cover washer 22 abuts the nut 24.

In this fashion, when assembled the bearing races are secured against non-rotational movement relative to one another. More specifically, the extensions 42 are anchored in place in the cups 60 of the centrally located spacer sleeve 26 that is pressed fit or snugly positioned in the central aperture 33. The spacer 26 spans any clearances or free space about extension 42 to prevent the inner race 30 from any rocking or axial movement but still provides rotational motion. The extensions 42 thus are anchored in place and resistant to torque, rocking or other non-rotational forces that may be exerted during use of the skate board more particularly during competitive and or high speed events.

Furthermore, the spacer sleeve 26 may have different dimensions to accommodate different wheels 18. Peripheral wall 48 and flange 56 (extending radially inward therefrom) more specifically may have different diameters and thicknesses respectively which allow use of the same bearings for wheels having different dimensioned hubs. This introduces flexibility into using standard parts more specifically standard sized bearings for hubs with differently sized axle apertures.

Other variations and modifications are possible without departing from the scope and spirit of the present invention as defined by the appended claims.

The embodiments in which an exclusive property or privilege is claimed are defined as follows:

1. A wheel bearing assembly comprising:
   a wheel having a hub with a central aperture and counterbores with said counterbores opposite each other and each having an outer wall that is cylindrical in shape and a radial shoulder;
   a wheel bearing being positioned in each counterbore;
   said wheel bearing having an outer race fitted into the outer wall of each counterbore and abutting the radial shoulder;
   each wheel bearing having an inner race;
   each inner race extending axially toward the middle of the wheel hub beyond each counterbore and having a respective opposing facing shoulder;
   a plurality of bearing members being seated between each inner race and outer race;
   each inner race having a central aperture to receive a truck axle for a skateboard;
   a spacer sleeve being centered between each wheel bearing;
   said spacer sleeve having a peripheral wall with an outer dimension sized to fit in said central aperture of the hub and an inner diameter to receive said inner race of each wheel bearing such that said outer race and said hub are rotatable with respect to said inner race; and
   said spacer sleeve having opposite radial shoulders facing and abutting said respective opposing facing shoulders of said respective inner races to reduce rocking and axial motion of said inner race with respect to said outer race.

2. A wheel bearing assembly as defined in claim 1 further comprising:
   each opposing facing shoulder being at an inner end of said respective inner race; and
   said opposite radial shoulders being on opposite sides of a central annular flange extending from said cylindrical wall; and
   said central annular flange having a central opening sized to receive said truck axle.

3. A wheel bearing assembly as defined in claim 2 further comprising:
   said truck axle extending through the bearing assembly and having a nut threadably engaged thereon and tightened to clamp said inner races and said spacer sleeve between itself and a radially outward extending shoulder on said truck axle.

4. A wheel bearing assembly comprising:
   a pair of wheel bearings each with an inner race and outer race for fitting into a hub of a wheel;
   a plurality of bearing members being seated between said inner and outer races;
   said inner races extending inboard beyond said outer races;
   a spacer sleeve that is centrally located having two cup shaped ends for nesting an end of each inner race;
   said cup shaped ends having an inner radially extending wall for facing and abutting a respective end wall of each inner race; and
   said spacer sleeve having an outer peripheral wall forming a side wall of said cup shaped openings and having an outer dimension for being received into said hub of said wheel.

5. A wheel bearing assembly comprising:
   a wheel bearing with an inner race and outer race for fitting into a hub of a wheel;
   a plurality of bearing members being seated between said inner race and said outer race;
   said inner race extending axially inboard beyond said outer race;
   a spacer sleeve having a cup shaped opening for nesting an end of the inner race;
   said cup shaped opening having an inner radial radially extending wall for abutting an end wall of said inner race; and said spacer sleeve having an outer dimension for being received into said hub of said wheel.

* * * * *